(12) United States Patent
Chesla et al.

(10) Patent No.: US 9,674,209 B2
(45) Date of Patent: *Jun. 6, 2017

(54) METHOD AND SYSTEM FOR DETECTING AND MITIGATING ATTACKS PERFORMED USING CRYPTOGRAPHIC PROTOCOLS

(71) Applicant: RADWARE, LTD., Tel Aviv (IL)

(72) Inventors: Avi Chesla, Tel Aviv (IL); Yosefa Shulman, Kfar-Saba (IL); Ziv Ichilov, Petah-Tikva (IL); Iko Azoulay, Kadima (IL)

(73) Assignee: Radware Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/146,321

(22) Filed: May 4, 2016

(65) Prior Publication Data

US 2016/0248790 A1     Aug. 25, 2016

Related U.S. Application Data

(63) Continuation of application No. 14/477,356, filed on Sep. 4, 2014, now Pat. No. 9,344,448, which is a continuation of application No. 13/425,978, filed on Mar. 21, 2012, now Pat. No. 8,832,831.

(51) Int. Cl.
*H04L 29/06* (2006.01)
*H04L 29/08* (2006.01)

(52) U.S. Cl.
CPC ...... *H04L 63/1416* (2013.01); *H04L 63/0428* (2013.01); *H04L 63/1425* (2013.01); *H04L 63/1441* (2013.01); *H04L 63/1458* (2013.01); *H04L 67/141* (2013.01); *H04L 29/06* (2013.01)

(58) Field of Classification Search
CPC . H04L 63/1441; H04L 63/1458; H04L 29/06; H04L 67/141
USPC ........................................................ 726/22, 23
See application file for complete search history.

(56) References Cited

U.S. PATENT DOCUMENTS

| | | |
|---|---|---|
| 7,363,500 B2 | 4/2008 | Funk |
| 7,464,407 B2 | 12/2008 | Nakae et al. |
| 7,484,011 B1 | 1/2009 | Agasaveeran et al. |
| 7,725,934 B2 | 5/2010 | Kumar et al. |
| 7,958,549 B2 | 6/2011 | Nakae et al. |
| 2005/0076228 A1 | 4/2005 | Davis et al. |
| 2006/0107318 A1 | 5/2006 | Jeffries et al. |
| 2007/0157300 A1 | 7/2007 | Sivaradjane et al. |
| 2007/0169190 A1 | 7/2007 | Kolton et al. |
| 2008/0172739 A1 | 7/2008 | Nakae et al. |
| 2009/0100518 A1 | 4/2009 | Overcash |
| 2009/0210712 A1 | 8/2009 | Fort |
| 2012/0174196 A1 | 7/2012 | Bhogavilli et al. |

*Primary Examiner* — Brandon Hoffman
*Assistant Examiner* — Samuel Ambaye
(74) *Attorney, Agent, or Firm* — M&B IP Analysts, LLC

(57) ABSTRACT

A method and system for detecting attacks performed using a cryptographic protocol are presented. The method includes upon receiving an indication about a potential attack, establishing an encrypted connection with a client device using the cryptographic protocol; receiving an inbound traffic from the client device, wherein the inbound traffic is originally directed to a protected entity; analyzing the inbound traffic received on the encrypted connection to detect at least one encrypted attack; and causing to establish a new encrypted connection between the client device and the protected entity, when the at least one encrypted attack at the application layer has not been detected.

25 Claims, 5 Drawing Sheets

METHOD AND SYSTEM FOR DETECTING AND MITIGATING ATTACKS PERFORMED USING CRYPTOGRAPHIC PROTOCOLS

CROSS REFERENCE TO RELATED APPLICATIONS

This application is a Continuation of U.S. patent application Ser. No. 14/477,356 filed on Sep. 4, 2014, now allowed. The Ser. No. 14/477,356 application is a Continuation of U.S. patent application Ser. No. 13/425,978 filed, on Mar. 21, 2012, now U.S. Pat. No. 8,832,831. The contents of the above-referenced applications are herein incorporated by reference.

TECHNICAL FIELD

This present disclosure generally relates to techniques for protecting network and computing resources from attacks performed using cryptographic protocols.

BACKGROUND

A significant problem facing the Internet community is that on-line businesses and organizations are vulnerable to malicious attacks. Recently, attacks have been committed using a wide arsenal of attack techniques and tools targeting both the information maintained by the on-line businesses and their IT infrastructure. Hackers and attackers are constantly trying to improve their attacks to cause irrecoverable damage, overcome current deployed protection mechanisms, and so on.

For example, recently identified attacks were committed through cryptographic protocols including, but not limited to, transport layer security (TLS), secure socket layer (SSL), and the like. A prime example for such attacks is the encrypted denial-of service (DoS) or encrypted distributed DoS (DDoS) attacks. A DoS/DDoS attack is an attempt to make a computer or network resource unavailable. A common technique for executing DoS/DDoS attacks includes saturating a target computer with external requests. As a result, the target computer becomes overloaded, thus it cannot respond properly to legitimate traffic. When the attacker sends many packets of information and requests to a single network adapter, each computer in the network would experience effects from the DoS attack. A DDoS attack is performed by controlling a large number of machines and directing them to attack as a group. Various techniques for mitigating non-encrypted DoS and DDOS attacks are discussed in the related art.

The encrypted DoS/DDoS are performed against servers having an encrypted connection with their clients. That is, the communication protocols utilized between servers and clients may include TLS, SSL, and the like. Encrypted DoS/DDoS attacks cannot be detected and mitigated by mere use of the conventional techniques for mitigating non-encrypted DoS/DDoS attacks. Specifically, current detection techniques typically are not adapted to decrypt the encrypted traffic, and encrypted Dos/DDoS attacks simply pass "under the radar" of existing security solutions.

The disability to detect and mitigate encrypted Dos/DDoS attacks significantly impacts online businesses that use cryptographic protocols. Such attacks greatly exploit the computing resources because encrypted traffic requires more resources for processing. For example, decryption of encrypted traffic consumes more CPU resources than processing of a non-encrypted traffic. Thus, even a "small scale" encrypted DoS attack can cause a targeted server to become unresponsive.

There are a number of conventional solutions that provided limited capabilities in detecting and mitigating threats of different types of attacks not including DoS/DDoS attacks performed through SSL protocols. Such solutions require processing of both ingress (from clients) and egress (from servers) traffic in order to detect and mitigate such attacks. For example, as a shown in FIG. 1A, an encrypted connection (e.g., a SSL connection) 101 is established between a client 110 and a server 120 and the traffic flows between them is copied to a decryption engine 130. The engine 130 is typically connected to a copy/span port of the network, thus traffic from both directions, i.e., egress traffic 102 and ingress traffic 103 are copied to the engine 130.

The decryption engine 130 decrypts the traffic using the encryption keys utilized by the client 110 and the server 120. Then, the decrypted traffic is processed to detect malicious threats in the traffic. One of the limitations of these solutions is that the decryption engine 130 must receive both the egress and ingress traffic direction in order to perform the decryption and to detect attacks, as the engine 130 must receive the encryption parameters of both the server and client. For example, in a SSL handshake, the server typically responds with a server "hello" message that contains the cryptographic method (cipher suite), the data compression method selected by the server, the session ID, and another random number.

Another conventional solution for mitigating encrypted (e.g., SSL) attacks is depicted in FIG. 1B. Here, a termination engine 140 is connected in-line with the traffic between the client 110 and the server 120. The termination engine 140 maintains the encrypted connections with the client 110 and server 120. With this aim, the termination engine 140 receives and processes the server's 120 replies in order to establish and maintain a server side TCP connection. In case the server side connection is required to be encrypted as well (e.g., SSL) then engine 140 receives the outbound traffic with the server's cryptographic parameters mentioned above.

As can be understood from the above discussion, the conventional solutions require an active connection with the server 120 and to receive traffic from the server in order to enable communication between the client and the server. Thus, the conventional encrypted attack detection solutions cannot be applied in secured datacenters that process only inbound (ingress) traffic. Typically, in such secured datacenters, when an attack is detected, only the inbound traffic is diverted through the attack mitigation device. The secured datacenters also include secured networks. As a result, the attack mitigation solution cannot decrypt the encrypted client-server traffic. This is due to the fact that the decryption engine 130 must receive cryptographic parameters that are provided in the outbound traffic and the termination engine 140 can establish a TCP connection with the server only if it receives the server's replies (i.e., process out bound traffic). In addition, cryptographic parameters are provided in the outbound traffic and require fully symmetric traffic (e.g., as part of the SSL handshake process). Furthermore, the conventional encrypted attack detection solutions are not adapted to detect Dos/DDoS encrypted attacks.

It would be, therefore, advantageous to provide an efficient security solution for detecting and mitigating attacks of encrypted DoS and/or DDoS attacks. It would be further advantageous if the proposed security solution would mitigate such attacks in a secured datacenter that processes only inbound traffic.

SUMMARY

Certain embodiments disclosed herein include a method for detecting attacks performed using a cryptographic protocol. The method comprises upon receiving an indication about a potential attack, establishing an encrypted connection with a client device using the cryptographic protocol; receiving an inbound traffic from the client device, wherein the inbound traffic is originally directed to a protected entity; analyzing the inbound traffic received on the encrypted connection to detect at least one encrypted attack; and causing to establish a new encrypted connection between the client device and the protected entity, when the at least one encrypted attack at the application layer has not been detected.

Certain embodiments disclosed herein also include a system for detecting attacks performed using a cryptographic protocol. The system comprises a processing system; a memory containing instructions that, when executed by the processing system, configure the system to: establish an encrypted connection with a client device using the cryptographic protocol, upon receiving an indication about a potential attack; receive an inbound traffic from the client device, wherein the inbound traffic is originally directed to a protected entity; analyze the inbound traffic received on the encrypted connection to detect at least one encrypted attack; and cause to establish a new encrypted connection between the client device and the protected entity, when the at least one encrypted attack at the application layer has not been detected.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
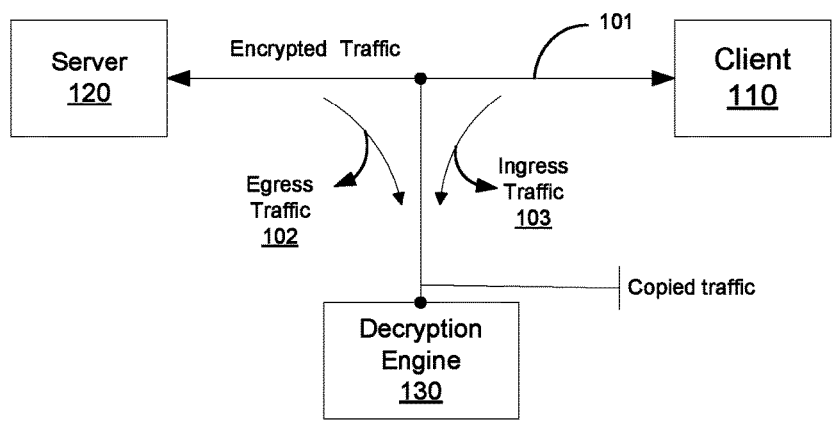
FIGS. 1A and 1B illustrate conventional solutions for detection of encrypted attacks.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 2:
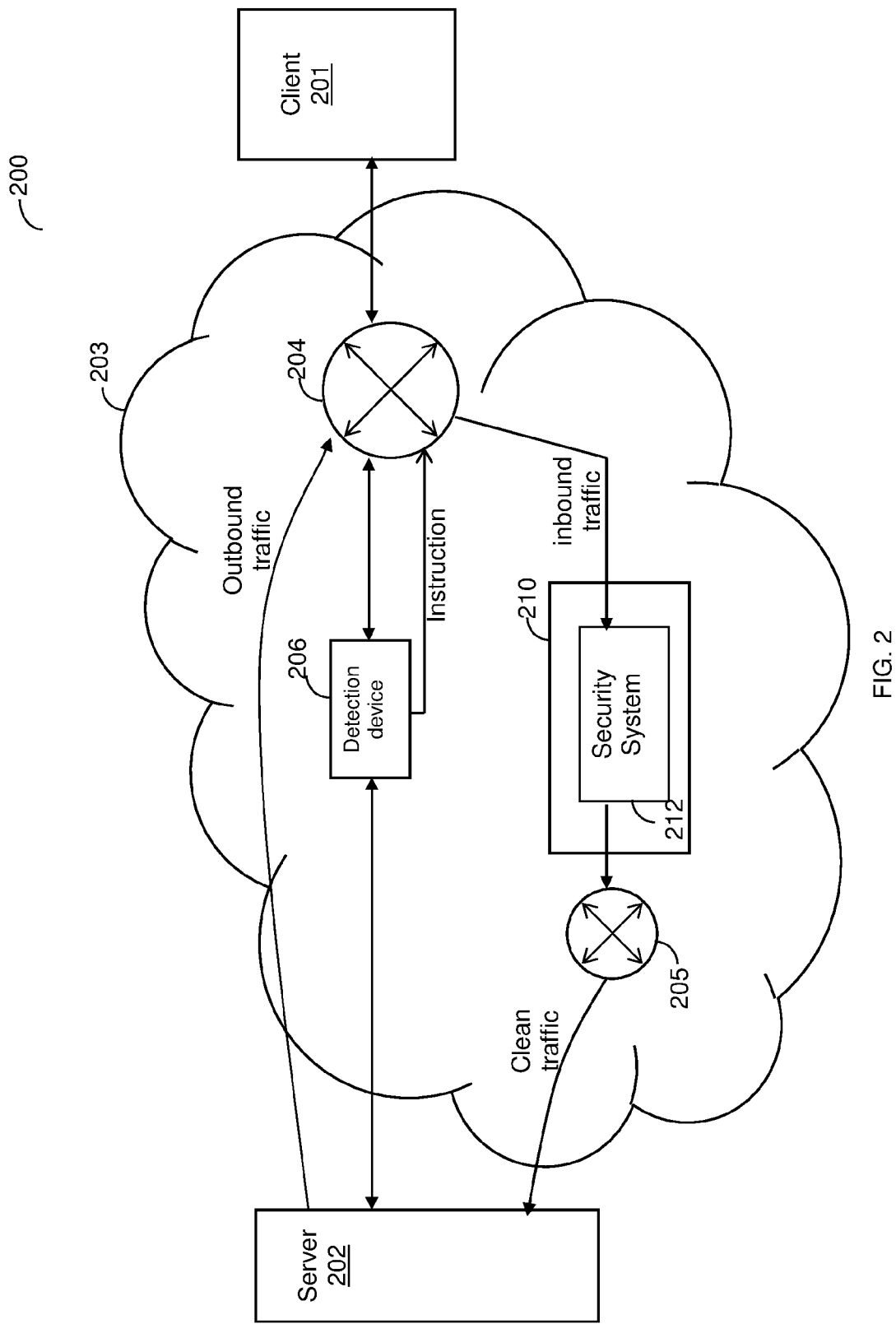
FIG. 2 illustrates a deployment of a secured datacenter utilized to describe various disclosed embodiments.

FIG. 2 illustrates a typical deployment 200 of a secured datacenter 210 utilized to describe various disclosed embodiments. In the deployment 200, a client 201 communicates with a server 202 using an application layer cryptographic protocol through a network 203. The server 202 is the entity to be protected from malicious threats. The application layer cryptographic protocol includes, but is not limited to, SSL and TLS, and the like.

The network 203 may be, but is not limited to, a local area network, a wide area network, the Internet, a cellular network, and a metropolitan area network (MAN), or any combination thereof. It should be noted that the network 203 may be a secured network and the deployment of the solution and in particular of the security system 212 is in the secured network. It should be noted that although one client 201 and one server 202 are depicted in FIG. 2 merely for the sake of simplicity, the embodiments disclosed herein can be applied to a plurality of clients and servers. The clients may be located in different geographical locations. The servers may be part of one or more datacenters, server frames, or combinations thereof.

The client 201 carries out the malicious attacks against the server 202, and particularly encrypted DoS and/or encrypted DDoS attacks (hereinafter "encrypted attack"). The client 201 may implement an attack tool that can be a dedicated tool for performing the encrypted attack or can be an infected device. Again, it should be noted that the embodiments disclosed herein are applied when multiple clients exist, thus multiple attack tools execute encrypted attacks against the server 202. Thus, the embodiments disclosed herein can also detect and mitigate a large scale attack campaign where a vast number of attack tools participate in attacking the protected entity, i.e., the server 202.

Also included in the deployment 200 are routers 204 and 205. The router 204, which may be realized as any network device, is configured to route traffic from the client 201 (hereinafter "inbound traffic") to both the server 202 and the secured datacenter 210, or to only the datacenter 210, based on instructions provided by a detection device 206 connected in-line of traffic between the client 201 and 202. The detection device 206 makes a simple determination if the inbound traffic is suspected of including threats based on network and bandwidth statistics. Such statistics may include an average number of active connections, an average number of packets received per second, and so on. If the inbound traffic is not according to the norm, then the inbound traffic is flagged as suspected and the router 204 is instructed to send the ingress traffic to the secured datacenter 210. In certain deployments, the detection device 206 can also be an out-of-path device that collects the statistics from the router 204, detects suspicious traffic, and instructs the router 204 (or any other relevant diversion point) to divert the inbound traffic in a case of that potential threats are detected. In one embodiment, the router 204 is preconfigured to always divert the inbound traffic to the datacenter 210. In another embodiment, the router 204 is instructed to divert the inbound traffic to the secured datacenter 210 by a command of a user (e.g., a system administrator).

Figure 1B:
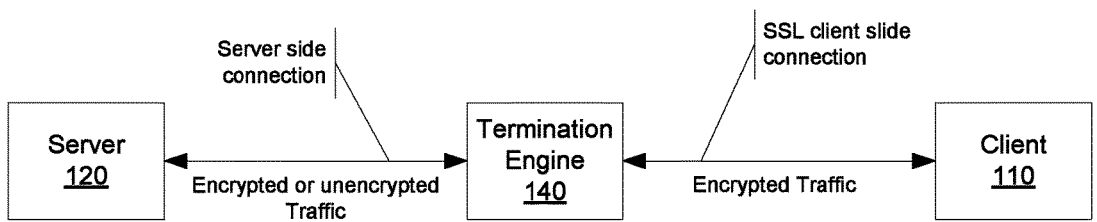

The router 204 also routes traffic from the server 202 (hereinafter "outbound traffic") to the client 201. The router 205 is connected in the data path between the secured datacenter 210 and the server 202 and is configured to divert traffic processed by the secured datacenter 210 (hereinafter "clean traffic"). In an embodiment, the router 205 is part of the secured datacenter 210 and/or integrated in the security system 212. In certain configurations, the deployment shown in FIG. 1 does not include the router 205 and the forwarding of the clean traffic to the server 202 is performed by the security system 212.

As the communication between the server 202 and client 201 is using a cryptographic protocol, the inbound traffic, outbound traffic, and clean traffic includes encrypted data packets. It should be appreciated that the secured datacenter 210 receives, and thus processes only inbound traffic. Therefore, the secured datacenter 210 supports asymmetric network conditions when handling malicious threats.

According to various embodiments, the secured datacenter 210 by means of a security system 212 included therein, is configured to process inbound traffic in order to detect and mitigate encrypted DoS/DDoS attacks against the protected server 202. In an embodiment, the security system 212 is further configured to perform one or more investigation and mitigation actions on the inbound traffic that contains traffic related to the encrypted attack in order to block the attacks and forward legitimate clean traffic by means of the router 205 to the server 202. As described below, the security system 212 may perform the mitigation actions without any prior knowledge of the network and/or application's normal traffic patterns, because the system 212 is further configured to process only inbound traffic under attack. The outbound traffic is always sent directly from the server 202 to the client 201 through the router 204. Thus, the security system 212 does not receive any outbound traffic from the server 202, thus cannot process such traffic.

Figure 3:
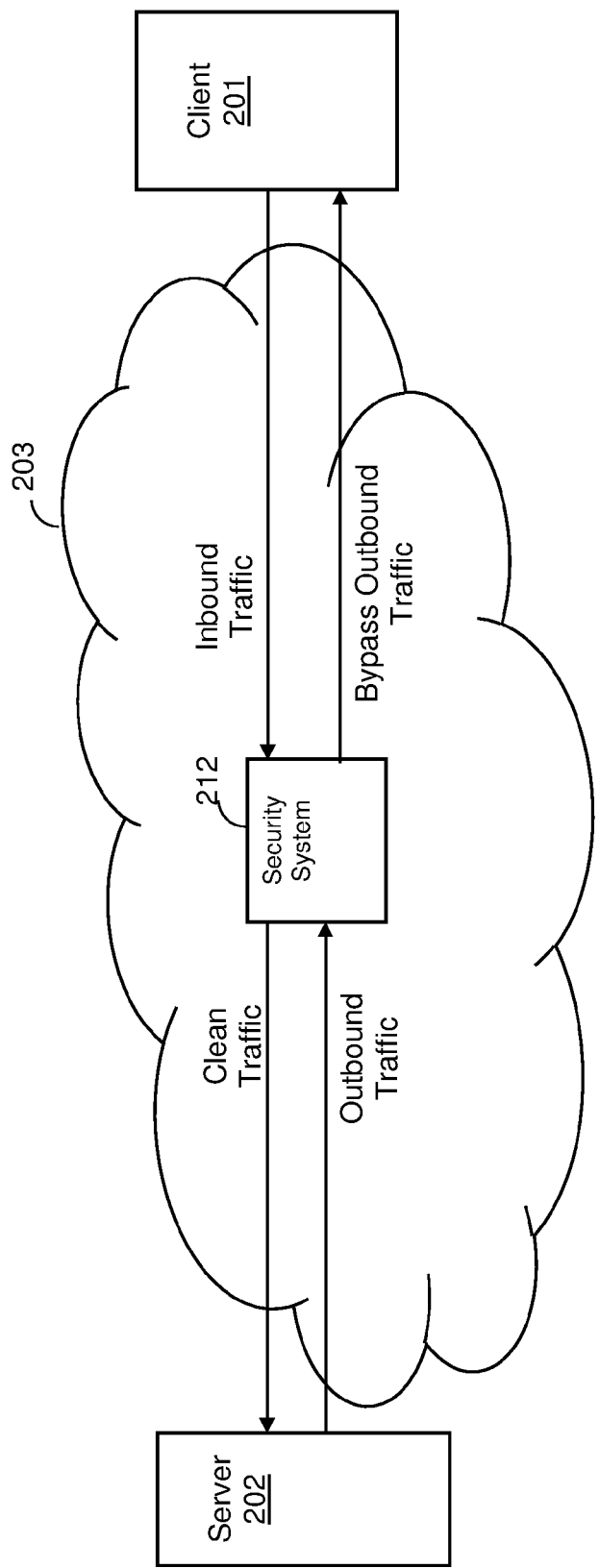
FIG. 3 illustrates an inline deployment of the security system according to one embodiment.

In accordance with another embodiment, illustrated in FIG. 3, the security system 212 is connected in-line with the traffic between the client 201 and server 202 (i.e., an in-line deployment). In both deployments, the system 212 is configured to process only inbound (ingress) traffic received from the client. In the in-line type of deployment, the system 212 transparently transfers outbound (egress) traffic from the server 202 to the client 201. Thus, the outbound traffic simply bypasses the security mechanisms in the system 212. It should be noted that in the in-line deployment, the detection device 206 can be replaced with, or otherwise integrated in the security system 212.

Figure 4:
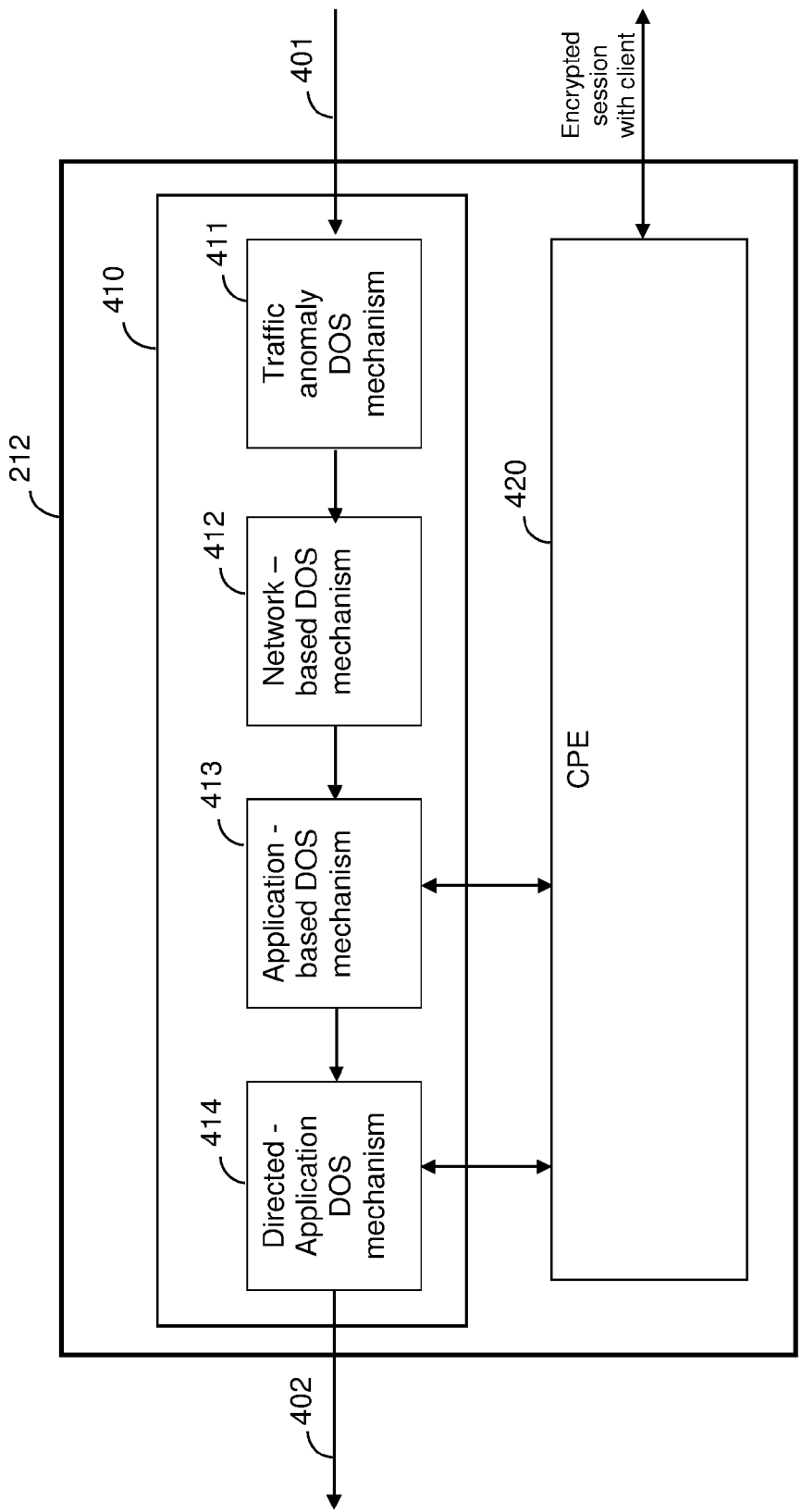
FIG. 4 is a block diagram of the security system for detecting and mitigating encrypted attacks according to one embodiment.

FIG. 4 shows an exemplary and non-limiting block diagram of the security system 212 for detecting and mitigating encrypted attacks according to an embodiment. As mentioned above, an encrypted attack includes a DoS and/or DDoS attack performed using at least one of the SSL and TLS communication protocols. It should be noted that the security system 212 can also handle unencrypted DoS or DDoS attacks.

The security system 212 includes a denial-of-service defense (DoSD) module 410 and a cryptographic protocol engine (CPE) 420. The DoSD module 410 implements various DoS protection mechanisms which are designed to detect and mitigate DoS attacks by analyzing unencrypted and encrypted traffic in the network and application layers. Specifically, as illustrated in FIG. 4, the DoS protection mechanisms included in the DoSD module 410 are: a traffic anomaly mechanism 411, a network-based DoS mechanism 412, an application-based DoS mechanism 413, and a directed-application DoS attack mechanism 414. The inbound traffic 401 is analyzed and processed by these protection mechanisms to detect and mitigate the attack sending the protected server clean traffic 402.

The DoSD module 410, its mechanisms 411 to 414, and the CPE 420 can be implemented in hardware, software, firmware, or combinations thereof. In one embodiment, the system 212 includes at least one processor to serve the various processing tasks performed by these components. In another embodiment, one or more of the DoS protection mechanisms 411 to 414 and the CPE 420 can be implemented by means of a dedicated processor to provide accelerated processing of the inbound traffic for the purpose of detecting and mitigating the encrypted attacks. In another embodiment, one or more of the DoS protection mechanisms 411 to 414 and the CPE 420 can be implemented by means of a distributed processing system using multiple processors and dedicated hardware circuits.

In one embodiment, the traffic anomaly mechanism 411 and the network-based DoS mechanism 412 handle DoS threats at the network layer (layers 3/4 TCP/IP). The traffic anomaly mechanism 411 is configured to detect DoS threats by identifying abnormal traffic behavior at the network layer. The network-based DoS mechanism 412 detects DoS threats by identifying known attack patterns at the network layer. Both mechanisms 411 and 412 process the inbound traffic.

The DoS threats include, but are not limited to, packet anomaly attacks, internet protocol (IP) fragment floods, packet flood attacks performed by protocols including TCP, UDP, Internet Control Message Protocol (ICMP), and Internet Group Management Protocol (IGMP), TCP spoofed SYN attacks, TCP connection flood attacks, and other layers 3/4 DoS attacks generated by known DoS attack tools.

The traffic anomaly mechanism 411 and the network-based DoS mechanism 412 can apply different detection and mitigation actions on such types of DoS attacks including, but not limited to, behavioral based analysis, TCP cookie mechanisms, rate limit engines, black lists, and the like. The mechanisms 411 and 412 are the entry stage of the DoSD module 410 and responsible to differentiate between legitimate traffic to DoS attack traffic using at least one or more of the above mentioned techniques. It should be noted that the mechanisms 411 and 412 process packets at layers 3/4 which may not be encrypted, in such communication layers for client L4 authentication. As mentioned above, the cryptographic protocols (e.g., SSL) operate in layer 7 (application layer).

The application-based DoS mechanism 413 detects and mitigates the encrypted attacks that misuse application resources, thus handling layer 7 types of DoS/DDoS threats. This is performed in part, using a challenge-response investigation technique discussed in detail below. The handling of the layer 7 threats is performed after completing cryptographic protocol handshake with the CPE 420.

It should be noted that the order of the processing performed by the traffic anomaly mechanism 411, network-based DoS mechanism 412, application-based DoS mechanism 413, and the directed-application DoS attack mechanism 414 is not limited to a specific order. Further, processing by two or more if the mechanisms 411-414 may be performed in parallel.

The directed-application mechanism 414 repels DoS attacks including the encrypted attacks using programmable filters not supported by the mechanisms 411, 412, and 413. The filters may also be set a priory. The filters are programmed, ad-hoc, to search for specific content patterns or signatures anywhere in the inbound traffic. This capability allows for analyzing ongoing attacks, and based on the analysis to program the filters to provide protections against such attacks. The programming of the filters in the mechanism 414 may be performed by a user or may be performed automatically based on predefined sets of filters that can be applied.

In accordance with the embodiments disclosed herein, the application-based DoS mechanism 413 and the directed-application mechanism 414 operate with the CPE 420 to detect and mitigate the encrypted attacks (and for client layer-7 authentication). The CPE 420 acts as a termination point (instead of the protected server 202) for the encrypted connection between the client and the security system 212 and is configured to handle all the processing tasks related to the cryptographic protocol utilized for communication between the client 201 and server 202. This includes at least establishing a TCP connection with the client 201 and performing an encryption handshake according to the provisions of the cryptographic protocol (e.g., SSL handshake) with the client 201.

Once the handshake process is completed, the CPE 420 receives encrypted packets in the inbound traffic, decrypts the packets, and forwards the decrypted packets to the DoSD module 410 for processing by the application-based DoS mechanism 413, and in some cases, with the directed-application DoS mechanism 414. With this aim, the CPE 420 holds the server certificate which typically contains the server's public key used by the client 201 to authenticate the server (hence the CPE 420).

In an exemplary embodiment, the cryptographic protocol is SSL, thus the CPE 420 acts as a SSL termination. In the SSL handshake process, the client 201 and the CPE 420 exchange a series of messages to negotiate the security parameters of the data transfer session. The security parameters include at least the certificates of the server 202, and certain embodiments may also include the certificates of the client 201. According to an embodiment, the CPE 420 sends to the client 201 the certificate of the server 202, and receives the certificates of the client.

Once the encrypted connection between the CPE 420 and client 201 has been negotiated i.e., the CPE 420 acts as the server 202 in front of the client 201, the application-based DoS mechanism 413 generates a client web challenge in order to determine if the client is real and not an attack tool (e.g., a Bot). The client web challenge may include a 302 HTTP redirect message, a JavaScript that includes, but not limited to, a redirect message, and the like. Typically, the client web challenge requires an action from the client 201. Thus, if the client is an attack tool that does not perform "real client" action, the client 201 would fail to provide the required response. Thus, any type of communication that would force the client 201 to authenticate can be used as the client web challenge.

The generated client web challenge is passed to the CPE 420 which encrypts the challenge and sends it to the client over the encrypted connection. The client web challenge is sent in response to a client request (over a new connection, redirect challenge). If the CPE 420 receives a response from the client during a predefined time-internal, the CPE 420 decrypts the response and passes it to the mechanisms 413 and 414 to determine if the response is correct. If the client 201 correctly responded to the web challenge (L7 authentication), the system 212 forces the client 201 to seamlessly open a new encrypted connection directly with the protected server 202. Then, a connection with the CPE 420 is dropped. In one embodiment, the traffic over the new encrypted connection is transferred through the security system 212, which bypasses such traffic according to the source IP address. That is, once a new encrypted connection is generated from an "authenticated" source IP (i.e., the client that responds correctly to the challenge), the connection request (e.g., SYN packet) bypasses the protection mechanisms and is directly sent to the server 202. In addition, the connection of the client 201 with the CPE 420 is dropped or otherwise terminated. It should be noted that as the system 212 enforces an authenticated client to automatically re-establish the encrypted connection, and then does not process the client's inbound traffic for a configurable authentication timeout period, thus allowing the detection and mitigation of encrypted DoS attacks by analyzing only inbound traffic.

Alternatively, if the client 201 is an attack tool, then the current encrypted connection between the CPE 420 and the client 201 is dropped. Thus, once a suspect traffic is identified, the connection between the server 202 and client 202 is terminated.

The direct-application DoS mechanism 414 also participates in blocking the encrypted attacks. With this aim, the mechanism 414 inspects the first HTTPS request generated by the client 201, and blocks the request if it matches a pre-defined attack signature that one of the mechanism's 414 filters is programmed with. It should be noted that in certain embodiments, the DoSD module 410 and CPE 420 of the security system 212 can be implemented and arranged as different devices, connected through a link.

Figure 5:
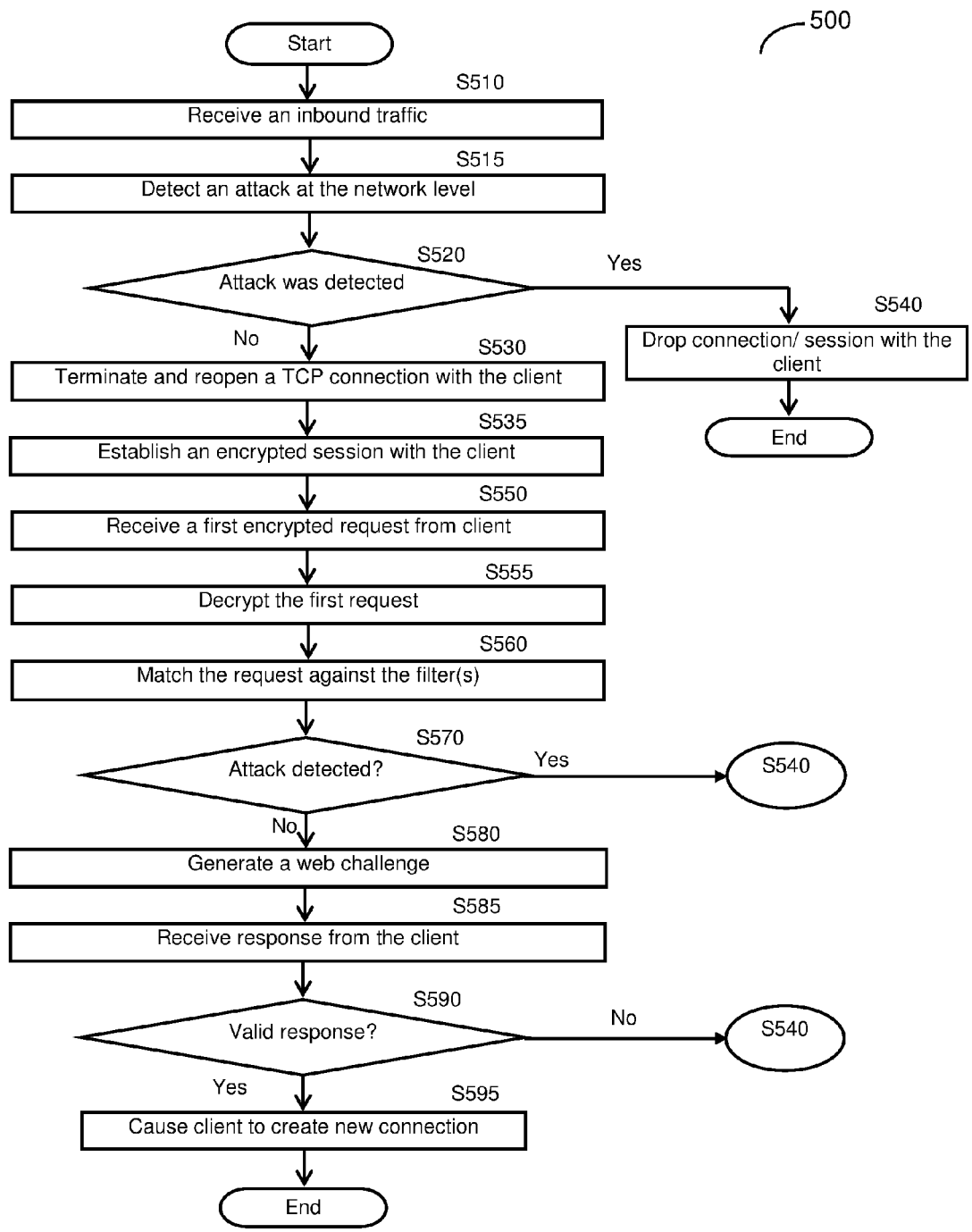
FIG. 5 is a flowchart describing a method for mitigating encrypted attacks according to an embodiment.

FIG. 5 illustrates an exemplary and non-limiting flow-chart 500 illustrating a method for mitigating encrypted attacks according to an embodiment. The method is performed by the system 212 located in the secured datacenter 210. The encrypted attacks may be one of DoS or DDoS attacks performed by means of a cryptographic protocol including, but not limited to, SSL and TLS.

At S510, an inbound traffic suspected to include an encrypted attack is received at the system 212. At S515, an attempt to detect and mitigate the encrypted attack at a network level is performed. The network level refers to the TCP/IP (unencrypted layers 3/4 headers). In an embodiment, such an attempt is made by the traffic anomaly mechanism 411 and/or the network-based DoS mechanism 412 in the DoSD module 410 of the security system 212. As a non-limiting example, the DoSD module 410 sends a SYN cookie to validate the IP address of the client 201. As another example, the DoSD module 410 may determine if the client 201 is an attack tool based on the data transmission rate or by any other pattern in the layers 3/4 headers. A relatively high transmission rate may provide an indication that the client is committing a DoS attack. Other techniques for detection DoS attacks at the network layers are discussed above.

At S520, it is checked if the network level authentication checks have passed, and if so execution continues with S530; otherwise, execution proceeds to S540 where the connection between the client 201 and protected server is dropped. Then, the execution terminates.

At S530, a TCP connection between the client and server is terminated. In addition, a new TCP connection is opened between the security system 212 and the client 201. In another embodiment, S530 may include performing a delayed binding connection between the CPE 420 and the DoSD module 410 instead of forcing the client 201 to open a new TCP connection with the CPE (re-use the connection). Then, at S535, a process for establishing an encrypted session between the client 201 and the system 212 is performed. As mentioned above, this includes a handshake process between the CPE 420 and the client 201 as defined by the provisions of the encrypted protocol. For example, this may include performing a SSL handshake during which the certificate of the server 202 which is provided to the client 201 by the CPE 420. Typically, the messages exchanged during the handshake process are not encrypted.

At S550, a first encrypted HTTP request is received at the CPE 420 over the encrypted session between the CPE 420 and the client 201. The HTTP request is at the application layer (layer 7). At S555, the first encrypted HTTP is decrypted by means of the CPE 420 and passed to the DoSD module 410. At S560, the decrypted request is matched against one or more predefined filters defined in the mechanism 414. The filters are programmed to identify known attack patterns and/or signatures.

At S570, it is checked if an attack was detected, if so execution continues with S540, where the encrypted session between the CPE 420 and the client is dropped and then execution terminates. Otherwise, at S580, a client web challenge is generated. This includes generating a client web challenge (e.g., 302 HTTP redirect message or a message with a JavaScript code and redirect message in the code). The challenge is generated by the DoSD module 410 and is being encrypted by the CPE 420. The encrypted challenge is sent over the encrypted session to the client 201 in response to a client's request. At S585, a response from the client 202 is received at the system 212.

At S590, it is checked if the client correctly responds to the web challenge. This includes decrypting the response from the client and matching the decrypted response against a correct response. If S590, results with a Yes answer (i.e., the client was "authenticated") then, at S595, the client 201 is triggered to establish a new connection directly with the server 202; otherwise, execution continues with S540 where the new encrypted session is dropped and then execution terminates.

In one embodiment, S595 includes sending the client an HTTP redirect message that contains a TCP FIN flag. Such a message forces the client to close a current connection and open a new one. As mentioned above, the new connection is established through the security system 212 with an "authenticated client," thus the inbound traffic bypasses the security mechanisms described above. The outbound traffic from the server to the client also bypasses the security mechanisms.

The foregoing detailed description has set forth a few of the many forms that different disclosed embodiments can take. It is intended that the foregoing detailed description be understood as an illustration of selected forms that the disclosed embodiment can take and not as a limitation to the definition of the claimed invention.

Most preferably, the various embodiments discussed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A method for detecting attacks performed using a cryptographic protocol, comprising:
   upon receiving an indication about a potential attack, establishing an encrypted connection with a client device using the cryptographic protocol;
   receiving an inbound traffic from the client device, wherein the inbound traffic is originally directed to a protected entity;
   analyzing the inbound traffic received on the encrypted connection to detect at least one encrypted attack; and
   causing to establish a new encrypted connection between the client device and the protected entity, when the at least one encrypted attack at the application layer has not been detected.

2. The method of claim 1, wherein analyzing the inbound traffic further comprises:
   analyzing at least one of application layer attributes of the inbound traffic to detect the at least one encrypted attack at a network layer.

3. The method of claim 2, wherein analyzing the application layer attributes further comprises:
   decrypting application layer requests received in the inbound traffic to reveal the application layer attributes; and
   matching the application layer attributes against at least one adaptive attack filter to detect the at least one encrypted attack, wherein the at least one adaptive attack filter defines at least one of content patterns and signatures associated with the at least one encrypted attack.

4. The method of claim 1, wherein analyzing the application layer attributes further comprises:
   generating an encrypted client web challenge;
   in response to a client device request included in the inbound traffic, sending the encrypted client web challenge to the client device over the encrypted connection;
   checking if the client correctly responds to the encrypted client web challenge; and
   determining the client initiated the at least one encrypted attack, when the client does not correctly respond to the encrypted client web challenge.

5. The method of claim 2, further comprising:
   analyzing at least one of the network layer attributes of the inbound traffic.

6. The method of claim 1, wherein an outbound traffic is relayed directly from the protected entity to the client.

7. The method of claim 1, wherein establishing the encrypted connection with the client device further comprises:
   establishing a network connection with the client device; and
   performing a handshake process with the client device based on provisions of the cryptographic protocol.

8. The method of claim 7, wherein the network connection is established as a delayed binding connection.

9. The method of claim 1, further comprising:
   mitigating the at least one detected encrypted attack.

10. The method of claim 8, further comprising:
    dropping the encrypted connection with the client device, when the client device initiated the at least one detected encrypted attack.

11. The method of claim 1, wherein the cryptographic protocol includes at least any one of a secure socket layer (SSL) protocol and a transport layer security (TLS).

12. The method of claim 1, wherein the at least one encrypted attack is any one of:
    an encrypted denial-of-service (DoS) attack and an encrypted distributed DoS (DDoS) attack.

13. A non-transitory computer readable medium having stored thereon instructions for causing one or more processing units to execute the method according to claim 1.

14. A system for detecting attacks performed using a cryptographic protocol, comprising:
   a processing system;
   a memory containing instructions that, when executed by the processing system, configure the system to:
   establish an encrypted connection with a client device using the cryptographic protocol, upon receiving an indication about a potential attack;
   receive an inbound traffic from the client device, wherein the inbound traffic is originally directed to a protected entity;
   analyze the inbound traffic received on the encrypted connection to detect at least one encrypted attack; and
   cause to establish a new encrypted connection between the client device and the protected entity, when the at least one encrypted attack at the application layer has not been detected.

15. The system of claim 14, wherein the system is further configured to:
   analyze at least one of application layer attributes of the inbound traffic to detect the at least one encrypted attack at a network layer.

16. The system of claim 15, wherein the system is further configured to:
   decrypt application layer requests received in the inbound traffic to reveal the application layer attributes; and
   match the application layer attributes against at least one adaptive attack filter to detect the at least one encrypted attack, wherein the at least one adaptive attack filter defines at least one of content patterns and signatures associated with the at least one encrypted attack.

17. The system of claim 16, wherein the system is further configured to:
   generate an encrypted client web challenge;
   in response to a client device request included in the inbound traffic, send the encrypted client web challenge to the client device over the encrypted connection;
   check if the client correctly responds to the encrypted client web challenge; and
   determine the client initiated the at least one encrypted attack, when the client does not correctly respond to the encrypted client web challenge.

18. The system of claim 15, wherein the system is further configured to:
   analyze at least one of the network layer attributes of the inbound traffic.

19. The system of claim 14, wherein an outbound traffic is relayed directly from the protected entity to the client.

20. The system of claim 14, wherein the system if further configured to:
   establish a network connection with the client device; and
   perform a handshake process with the client device based on provisions of the cryptographic protocol.

21. The system of claim 20, wherein the network connection is established as a delayed binding connection.

22. The system of claim 1, wherein the system is further configured to:
   mitigate the at least one detected encrypted attack.

23. The system of claim 22, wherein the system is further configured to:
   drop the encrypted connection with the client device, when the client device initiated the at least one detected encrypted attack.

24. The system of claim 14, wherein the cryptographic protocol includes at least any one of a secure socket layer (SSL) protocol and a transport layer security (TLS).

25. The system of claim 14, wherein the at least one encrypted attack is any one of: an encrypted denial-of-service (DoS) attack and an encrypted distributed DoS (DDoS) attack.

* * * * *